United States Patent [19]

Tacke et al.

[11] 4,177,185

[45] Dec. 4, 1979

[54] FLAMEPROOF POLYAMIDE MOULDING COMPOSITION

[75] Inventors: Peter Tacke; Dieter Neuray; Dietrich Michael, all of Krefeld, Fed. Rep. of Germany

[73] Assignee: Bayer Aktiengesellschaft, Fed. Rep. of Germany

[21] Appl. No.: 752

[22] Filed: Jan. 3, 1979

[30] Foreign Application Priority Data

Jan. 5, 1978 [DE] Fed. Rep. of Germany ....... 2800467

[51] Int. Cl.² ............................ C08K 3/32; C08K 5/51
[52] U.S. Cl. ................................. 260/38; 260/45.9 NP; 525/480; 525/504
[58] Field of Search ............. 260/37 N, 841, 45.9 NP, 260/38

[56] References Cited

U.S. PATENT DOCUMENTS

| 3,397,035 | 8/1968 | Yu Shen .................... 260/45.9 NP |
| 3,527,725 | 9/1970 | Strauss et al. .................... 260/841 |
| 3,944,518 | 3/1976 | Burrows et al. ............. 260/45.9 NP |
| 4,062,687 | 12/1977 | Mauric et al. ................ 260/45.9 NP |

FOREIGN PATENT DOCUMENTS

| 2217364 | 9/1974 | France ............................. 260/45.9 NP |
| 1461615 | 1/1977 | United Kingdom. | |

*Primary Examiner*—Sandra M. Person
*Attorney, Agent, or Firm*—Connolly and Hutz

[57] ABSTRACT

Self-extinguishing optionally reinforced polyamide moulding compositions containing as flameproofing combination or phenol/aldehyde resin and phosphoryl nitride oxide or a precursor thereof.

6 Claims, No Drawings

FLAMEPROOF POLYAMIDE MOULDING COMPOSITION

This invention relates to self-extinguishing polyamide moulding compositions which contain, as flameproofing agent, a combination of phenol/aldehyde resins and $(PNO)_x$ (phosphoryl nitride) or precursors of $(PNO)_x$.

It is well known to those skilled in the art, that combinations of halogen compounds with synergisticallyacting metal compounds or powder-form red phosphorus are currently used on a commercial scale as highly effective flameproofing agents for polyamide moulding compositions. These flameproofing agents and the use thereof are described, for example, in U.S. Pat. No. 3,418,267, in German Auslegeschrift Nos. 1,694,494 and 1,931,387 and in German Offenlegungsschrift No. 2,544,219.

According to the prior art, however, the halogen compounds show only little effect and red phosphorus no effect whatever as flameproofing agents for non-reinforced and unfilled polyamides.

Halogen compounds reduce the tracking resistance of polyamide moulding compositions. In addition, hydrogen halide is split off in the event of fire and may cause considerable corrosion in and around the seat of the fire. Moulding compositions containing halogen compounds even split off small quantities of hydrogen halide in the processing machines at the high processing temperatures required, resulting in damage to the machines.

Powder-form red phosphorus is difficult to handle because, in the presence of air, it shows a tendency towards dust explosions on coming into contact with hot metal surfaces under conditions of the type generally encountered in the machines normally used for producing and processing the moulding compositions.

Another disadvantage lies in the ready formation of toxic phosphorus-hydrogen compounds by reaction of the phosphorus with polyamides at the high processing temperatures of the moulding compositions. Numerous additional process steps, for example of the type described in German Auslegeschrift Nos. 2,308,104; 2,625,673 and 2,625,691, have been recommended in order to limit this formation of toxic phosphorushydrogen compounds as far as possible.

Furthermore, the natural red colour of the phosphorus makes it difficult to provide moulding compositions having light colours. The amount of white pigments required to conceal the red colour results in a deterioration of the mechanical properties.

German Offenlegungsschrift No. 2,150,484 describes the use of nitrogen-containing compounds of phosphorus as flameproofing agents for glass fibrereinforced polyamide moulding compositions. The products in question are substantially colourless products which are easy to handle. Unfortunately, the flameproofing effect thereof in polyamide moulding compositions does not comply with the present strict requirements on fire prevention, even in amounts of up to 15%, by weight. For example, it does not comply with Fire Class Vl or VO of the Test Standard of Underwriters' Laboratories (UL), Subject 94, for ASTM test bars having thicknesses of 1/16" and ⅛.

German Offenlegungsschrift Nos. 2,317,282 = British Pat. Nos. 1,461,615 and 2,355,575 = British Pat. No. 1461 615 describe the production of polymeric phosphorus nitride oxide $(PNO)_x$ and its use as a flameproofing agent for non-reinforced polyamide moulding compositions. However, with this agent it is not possible to reach a flame resistance of VL or VO according to UL, but only V2. However, the requirements of this fire class are also satisfied by non-reinforced polyamide moulding compositions themselves according to the UL "Recognised Component Index" without any particular flameproofing. Accordingly, the flameproofing effect of phosphoryl nitride in polyamide moulding compositions can be regarded as minimal.

It has now been found that a combination of phenol/aldehyde resins and small quantities of $(PNO)_x$ or precursors thereof has an excellent effect as flameproofing agent both for reinforced and not reinforced polyamide moulding compositions.

Since all the components of the flameproofing combination are colourless or white, it is possible to use the flameproofing agent combinations according to the present invention to obtain light-coloured polyamide moulding compositions having a flame-resistance of VO (according to UL) which do not have any of the abovementioned disadvantages of halogen compounds or of red phosphorus as flame-proofing agents.

One particular advantage of the intentive flameproofing agent combinations lies in the fact that an excellent flame resistance may even be obtained by using only small quantities, for example of from 2 to 5%, by weight, of the phosphorus-nitrogen compounds, based on the moulding composition as a whole.

As mentioned above, an effective flameproofing agent combination is provided not only by $(PNO)_x$ together with aldehyde/phenol condensation resins, but also by a precursor of $(PNO)_x$ which is obtained by heating the starting materials to a temperature of only from 330 to 350° C. instead of to a temperature of about 800° C. Preferred starting materials are the acids of phosphorus, such as phosphoric acid, phosphorous acid or metaphosphoric acid, the amides thereof or phosphorus pentoxide, and urea or pyrolysis products of urea, such as melamine.

Accordingly, the present invention relates to self-extinguishing thermoplastic polyamide moulding compositions consisting of:
(1). from 40 to 95%, by weight, preferably from 50 to 85%, by weight, of polyamide;
(2). from 0.5 to 20%, by weight, preferably from 2 to 12%, by weight, of phenol/aldehyde resin;
(3). from 0.2 to 12%, by weight, preferably from 1 to 6%, by weight, of polymeric phosphoryl nitride oxide $[(PNO)_x]$ and/or a precursor of phosphoryl nitride oxide having the following composition:
(a) from 20 to 50.8%, by weight, of P,
(b) from 15 to 23%, by weight, of N,
(c) from 45 to 26.2%, by weight, of O,
(d) from 12 to 0%, by weight, of C,
(e) from 8 to 0%, by weight, of H; and
(4). from 0 to 50%, by weight, preferably from 0 to 35%, by weight, of reinforcing materials and/or fillers, the sum of (1) to (4) respectively (a)−(b) always amounting to 100%, by weight.

Polyamides which may be used for the moulding compositions according to the present invention include polyamide-6, polyamide-6,6, mixtures thereof, block polymers and copolymers of ε-caprolactam, adipic acid, hexamethylene diamine, also polyamide-11 and polyamide-12 and polyamides synthesised from aliphatic diamines and adipic acid and/or isophthalic acid and/or terephthalic acid and/or sebacic acid and/or azelaic acid and/or cyclohexane dicarboxylic acid.

In addition to hexamethylene diamine, suitable aliphatic diamines include: 2,2,4- and 2,4,4-trimethyl hexamethylene diamine, isophorone diamine, 1,3- and 1,4-bis-aminocyclohexane, bis-aminocyclohexyl alkanes and xylylene diamine.

In addition, it is possible to use polyamides produced from the above-mentioned aliphatic dicarboxylic acids and aromatic diamines, such as m- and p-phenylene diamine, and also polyamide mixtures and copolyamides of the above-mentioned components, providing aliphatic and partially aliphatic polyamides are obtained. Polyamide-6 and polyamide-6,6 are particularly preferred.

Preferred phenol/aldehyde condensation resins are linear condensation resins which soften at temperatures of from −30° to +350° C. and which are obtained by condensing phenols and formaldehyde and/or acetaldehyde.

Suitable phenol-containing compounds from which the resins may be produced are, inter alia, phenols, n- and isoalkyl phenols containing up to 8 carbon atoms in the side chains, naphthols, hydroxy diphenyls, hydroxy diphenyl ethers, pyrocatechol, resorcinol, hydroquinone, bis-(hydroxy-phenyl)-alkanes and/or cycloalkanes having, in each case, up to 20 carbon atoms, bis-(hydroxyphenyl)-sulphides, bis-(hydroxyphenyl)-sulphones and hydroxy benzoic acids.

The phenol/aldehyde resins may be obtained by known methods of the type described, for example, in Houben-Weyl, Methoden der organischen Chemie, Vol. 14/2, 4th Edition, pages 274 et seq.

The molar ratio of aldehyde to the phenolic compound is generally from 0.3:1 to 1.2:1, preferably from 0.5 to 0.9:1. It is preferred to use the novolaks obtained by acidic condensation reaction.

In order to increase its melt viscosity, the phenol/aldehyde resin may be cross-linked using boric acid, phosphoric acid, phosphorous acid, esters of phosphorous and phosphoric acids, polybasic carboxylic acids, polyfunctional isocyanates, polyfunctional epoxides or $PCl_3$. The cross-linking agent may be added to the resin in an amount of up to 25%, by weight. Preferred cross-linking agents are polyfunctional epoxides, phosphoric acid and boric acid.

The phenol/aldehyde condensation resin should preferably have a minimum viscosity of 200 Poises at 200° C.

In addition, it may be advantageous to convert the phenol/aldehyde resins into metal salts because the effectiveness of the flameproofing agent combination is generally improved in this way. Metals suitable for salt formation include: alkali and alkaline earth metals, zinc, cadmium, tin, lead, antimony, aluminium, copper, manganese, iron, cobalt and nickel. One or more of the metals may be present in the resins. The metal salts may be produced, for example, from the phenol/aldehyde resins and the oxides, hydroxide, carbonates, acetates, formates, phosphates or borates of the metals. Up to 15%, by weight, of these metal compounds, preferably the oxides, may be added to the resins.

The phenol/aldehyde resins may even be grafted onto the polyamide component of the moulding compositions according to the present invention providing the cross-linking agent, for example a diepoxide, has not yet reacted or has not completely reacted with the resin or is reactive enough to be able to react with the polyamide during incorporation of the flameproofing agents.

The production of $(PNO)_x$ is known and is described, for example, in German Offenlegungsschrift Nos. 2,317,282 and 2,355,575. It is also described in "Gmelins"-Handbuch der anorg. Chemie, 8th Edition, Vol. 16 section (1965), page 329. The precursors which may also be used in accordance with the present invention are obtained by heating the starting materials to a lower temperature as mentioned above.

The flameproofing agents are incorporated, optionally together with reinforcing agents and/or fillers, processing aids, pigments, dyes and stabilizers, into the polyamide preferably by means of conventions twin-screw extruders and according to known methods. However, single-screw extruders and kneaders may also be used. Suitable reinforcing materials and fillers, processing aids, pigments, dyes and stabilisers, which may be present in the moulding compositions in known amounts of up to 50%, by weight, of, inter alia, glass and asbestos fibres, glass beads, talcum, wollastonite, Microvit, chalk, quartz, carbon black, cadmium sulphide, phthalocyanines, salts of stearic acid and sterically hindered phenols can be incorporated. Preferred reinforcing materials are fibres, particularly glass fibres, whilst preferred fillers are chalk, Microvit, wollastonite, quartz or talcum.

The moulding compositions according to the present invention may be processed in conventional injection-moulding machines to form self-extinguishing, flameproof polyamide mouldings.

EXAMPLES

The polymeric substance $(PNO)_x$ was produced in accordance with Example 1 of German Offenlegungsschrift No. 2,355,575 = British patent 1 461 615, i.e. by thoroughly mixing melamine with phosphorus pentoxide and heating the resulting mixture first for about 45 minutes to a temperature of 600° C. and then for 30 minutes to from 600° to 650° C. The product obtained is a pale grey powder having the following elemental analysis:

|   | observed | calculated |
|---|---|---|
| P | 50.53 | 50.8 |
| N | 22.85 | 23 |

In addition, urea and $P_4O_{10}$ (finely powdered) in a molar ratio of 6:1 were thoroughly mixed in a tumble mixer and the resulting mixture heated to 340° C. over a period of 3 hours. After grinding, the light grey product obtained after cooling had an average composition of:
33.7% P,
20.8% N,
3.1% C,
2.55% H,
39.85% O.

This product was used under the term "precursor" as flameproofing agent in the following Examples.

The following resins were produced in accordance with Houben-Weyl, Methoden der organischen Chemie, Vol. 14/2, 4th Edition, Makromolekulare Stoff II, pages 273 et seq:
(A.) Novolak of phenol and formaldehyde, softening range 113°–119° C., page 273.
(B.) Novolak of p-phenyl phenol and formaldehyde, softening range 87°–123° C., page 274.

(C.) Novolak of p-cresol and formaldehyde according to the procedure of test B, but using 600 g of p-cresol instead of 945 g of p-phenyl phenol, softening range 78°–112° C.
(D.) Novolak of resorcinol and formaldehyde, softening range 98°–121° C., page 274.
(E.) Novolak of phenol and acetaldehyde, softening range 117°–122° C., page 275.
(F.) Resol of phenol and formaldehyde, resin of high viscosity at 20° C., page 278.

As indicated in Table 1, resins (A) to (F) were cross-linked and converted into metal salts. After the finished resins have been cast onto metal plates, they hardened quickly to form brittle products which could readily be size-reduced to a particle diameter of from about 2 to 4 mm. The cross-linking conditions for resins I to XII are shown in Table 1.

Table 1

Cross-linking of the phenol/aldehyde resins and conversion into metal salts

| Resin | Addition | | % by weight | Reaction temperature (°C.) | Reaction time (n) |
|---|---|---|---|---|---|
| I | A | diepoxide* | /5 | 230 | 5 |
| II | A | triethylphosphate | /3 | 180–230 | 5 |
| III | A | ZnO | /1.5 | 230 | 4 |
| IV | A | diepoxide*/7 | //ZnCO$_3$/0.5 | 230 | 1 |
| V | A | boric acid | /1.1 | 240 | 3 |
| VI | A | CaCO$_3$ | /1.3 | 250 | 3 |
| VII | B | Fe CO$_3$ | /2 | 240 | 3 |
| VIII | C | diepoxide* | /3.5 | 230 | 5 |
| IX | C | H$_3$PO$_4$ | /0.5 | 210 | 2.5 |
| X | D | diepoxide* | /2.4 | 230 | 5 |
| XI | E | diepoxide* | /4 | 230 | 5 |
| XII | F | tolylene diisocyanate | /3 | 200 | 1 |

*diglycidyl ether of 2,2-bis-(4-hydroxyphenyl)-propane (Bisphenol A)

EXAMPLES 1 to 24

The phenol/aldehyde resins and (PNO)$_x$ or its precursor were worked into the polyamides, optionally together with fillers, reinforcing materials, pigments and auxiliaries, in a single-screw extruder of the type manufactured by the Reifenhauser company having a screw diameter (D) of 30 mm and a screw length of 20 D.

The composition, the incorporation conditions and the flame resistance of the composition are set forth in Table 2.

For testing the burning behaviour of the moulding compositions in accordance with UL, Subject 94, ASTM test bars measuring approximately 1.5×12.5×127.5 mm and 3×12.5×127.5 mm were produced by injection moulding.

The relative viscosity ($\eta_{rel}$) of the polyamides was measured of a 1% solution in m-cresol at a temperature of 23° C.

Table 2

Compositions, production conditions and burning behaviour of the PA-composition

| | Test No. | Polyamide | %, by weight of PA in the composition | (PNO)$_x$ or precursors in %, by weight | Resin in %, by weight |
|---|---|---|---|---|---|
| ↑↑ | 1 | PA-6,6 $\eta_{rel}$ = 3.07 | 53 | (PNO)$_x$/12 | — |
| ↑ | 2 | PA-6,6 $\eta_{rel}$ = 3.07 | 53 | precursor/12 | — |
| ↑ | 3 | PA-6,6 $\eta_{rel}$ = 3.07 | 88 | (PNO)$_x$/12 | — |
| ↑↑ | 4 | PA-6,6 $\eta_{rel}$ = 3.07 | 88 | precursor/12 | — |
| | 5 | as 1 | 53 | — | A/12 |
| ↑ | 6 | as 1 | 53 | — | I/12 |
| ↑ | 7 | as 3 | 88 | — | I/12 |
| ↑ | 8 | as 1 | 55 | (PNO)$_x$/4 | I/6 |
| ↑↑ | 9 | as 1 | 55 | precursor/4 | I/6 |
| | 10 | as 3 | 90 | (PNO)$_x$/4 | I/6 |
| ↑ | 11 | as 3 | 90 | precursor/4 | I/6 |
| Comparison tests | 12 | PA-6/ $\eta_{rel}$ 2.97 | 60 | cursor/4 | II/6 |
| ↓ | 13 | PA-6/ $\eta_{rel}$ 2.97 | 61 | cursor/3 | III/6 |
| ↓ | 14 | 50/50 mixture of 3 + 12 | 90 | cursor/4 | IV/6 |
| ↓ | 15 | 50/50 mixture of 3 + 12 | 80 | cursor/4 | V/6 |
| ↓ | 16 | PA of isophthalic acid and hexamethylene diamine, $\eta_{rel}$ = 2.64 | 90 | precursor/4 | VI/6 |
| ↓ | 17 | PA-6,6/ | 90 | pre- | VII/6 |

Table 2-continued

Compositions, production conditions and burning behaviour of the PA-composition

| Test No. | Polyamide | %, by weight of PA in the composition | (PNO)$_x$ or precursors in %, by weight | Resin in %, by weight |
|---|---|---|---|---|
| 18 | $\eta_{rel} = 3.94$ PA-6/ | 90 | cursor/4 pre-cursor/4 | VIII/6 |
| 19 | $\eta_{rel} = 4.05$ as 3 | 90 | cursor/4 | IX/6 |
| 20 | as 3 | 90 | cursor/4 | XI/6 |
| 21 | as 3 | 89 | cursor/4 | XI/6 |
| 22 | as 3 | 90 | cursor/4 | XII/6 |
| 23 | as 3 | 89 | cursor/4 | A/6 |
| 24 | as 1 | 54 | cursor/4 | I/6 |

| Test No. | Other additives % by weight | Mass temp. °C. | Burning behaviour according to UL, Subject 94 Test bar thickness | |
|---|---|---|---|---|
|  |  |  | 1.5 mm | 3 mm |
| 1 | glass fibres/35 | 280 | burns away | burns away |
| 2 | glass fibres/35 | 280 | burns away | burns away |
| 3 | glass fibres/35 | 265 | V2 | V2 |
| 4 | glass fibres/35 | 265 | V2 | V2 |
| 5 | glass fibres/35 | 280 | burns away | burns away |
| 6 | glass fibres/35 | 280 | burns away | burns away |
| 7 | glass fibres/35 | 265 | burns away | burns away |
| 8 | glass fibres/35 | 280 | V0 | V0 |
| 9 | glass fibres/35 | 280 | V0 | V0 |
| 10 | glass fibres/35 | 265 | V0 | V0 |
| 11 | glass fibres/35 | 265 | V0 | V0 |
| 12 | glass fibres/30 | 265 | V1 | V0 |
| 13 | wollastonite/30 | 260 | V1 | V1 |
| 14 | wollastonite/30 | 270 | V0 | V0 |
| 15 | talcum/10 | 280 | V0 | V0 |
| 16 | talcum/10 | 265 | V0 | V0 |
| 17 | talcum/10 | 285 | V0 | V0 |
| 18 | talcum/10 | 265 | V0 | V0 |
| 19 | talcum/10 | 285 | V0 | V0 |
| 20 | talcum/10 | 285 | V1 | V0 |
| 21 | TiO$_2$/1 | 285 | V0 | V0 |
| 22 | TiO$_2$/1 | 285 | V1 | V1 |
| 23 | TiO$_2$/1 | 285 | V1 | V0 |
| 24 | TiO$_2$/1 glass fibres/35 | 285 | V0 | V0 |

(Tests 1–7 are comparison tests; tests 8–24 are example tests)

We claim:

1. A self-extinguishing thermoplastic moulding composition which comprises:
   (1) from 40 to 95%, by weight, of a polyamide,
   (2) from 0.5 to 20%, by weight, of a phenol/aldehyde resin;
   (3) from 0.2 to 12%, by weight, of a polymeric phosphoryl nitride oxide and/or a precursor thereof consisting of:
   (a) from 20 to 50.8%, by weight, of P,
   (b) from 15 to 23%, by weight, of N,
   (c) from 45 to 26.2%, by weight, of O,
   (d) from 12 to 0%, by weight, of C and
   (e) from 8 to 0%, by weight, of H;
   and, optionally,
   (4) from 0 to 50%, by weight, of one or more reinforcing materials and/or fillers.

2. A composition as claimed in claim 1 comprising: from 50 to 85%, by weight, of (1); from 2 to 12%, by weight, of (2); from 1 to 6%, by weight, of (3); and, optionally, from 0 to 35% by weight, of (4).

3. A composition as claimed in claim 1, wherein (2) contains up to 25%, by weight, of one or more cross-linking agents.

4. A composition as claimed in claim 1, wherein (2) is at least partially in the form of a metal salt.

5. A composition as claimed in claim 1, wherein (4) is glass fibres.

6. A composition as claimed in claim 1, wherein the polyamide is polyamide-6 or polyamide-6,6.

* * * * *